United States Patent [19]

Koyahata et al.

[11] 4,234,194
[45] Nov. 18, 1980

[54] STYLUS LEAD-IN MECHANISM OF RECORD PLAYER

[76] Inventors: Hirosi Koyahata; Nobuo Suzuki, both of 762 Niiharu-cho, Midori-ku, Yokohama-shi, Kanagawa-ken, Japan

[21] Appl. No.: 967,570

[22] Filed: Dec. 8, 1978

Related U.S. Application Data

[63] Continuation-in-part of Ser. No. 887,558, Mar. 17, 1978, abandoned.

[30] Foreign Application Priority Data

Mar. 22, 1977 [JP] Japan .................. 52/34652[U]
Oct. 4, 1977 [JP] Japan .................. 52/119275
Oct. 17, 1977 [JP] Japan .................. 52/138129[U]

[51] Int. Cl.³ .................................... G11B 17/16
[52] U.S. Cl. .................................... 274/10 R
[58] Field of Search .................................... 274/10 R

[56] References Cited

U.S. PATENT DOCUMENTS

| 3,822,889 | 7/1974 | Nakagawa | 274/10 R |
| 3,847,401 | 11/1974 | Evans | 274/10 R |
| 4,039,194 | 8/1977 | Nakagawa | 274/10 R |

Primary Examiner—Steven L. Stephan
Attorney, Agent, or Firm—George B. Oujevolk

[57] ABSTRACT

An automatic record player for playing disc records of various sizes has a turntable, a tone arm, an elevation rod of the tone arm, a tone arm auto-return mechanism, an elevation mechanism of the tone arm, an energizing mechanism for automatically moving the tone arm toward the turntable, a stopping mechanism for stopping the tone arm on a lead-in groove of a disc record of any size, an operation mechanism for operating the elevation mechanism, the energizing mechanism, and the stopping mechanism, and a switch operating mechanism for operating a micro-switch of an electric motor of the turntable. The elevation mechanism, the energizing mechanism, the stopping mechanism, and, the switch operating mechanism can be remotely operated individually or together by an operation lever of the operation mechanism.

7 Claims, 26 Drawing Figures

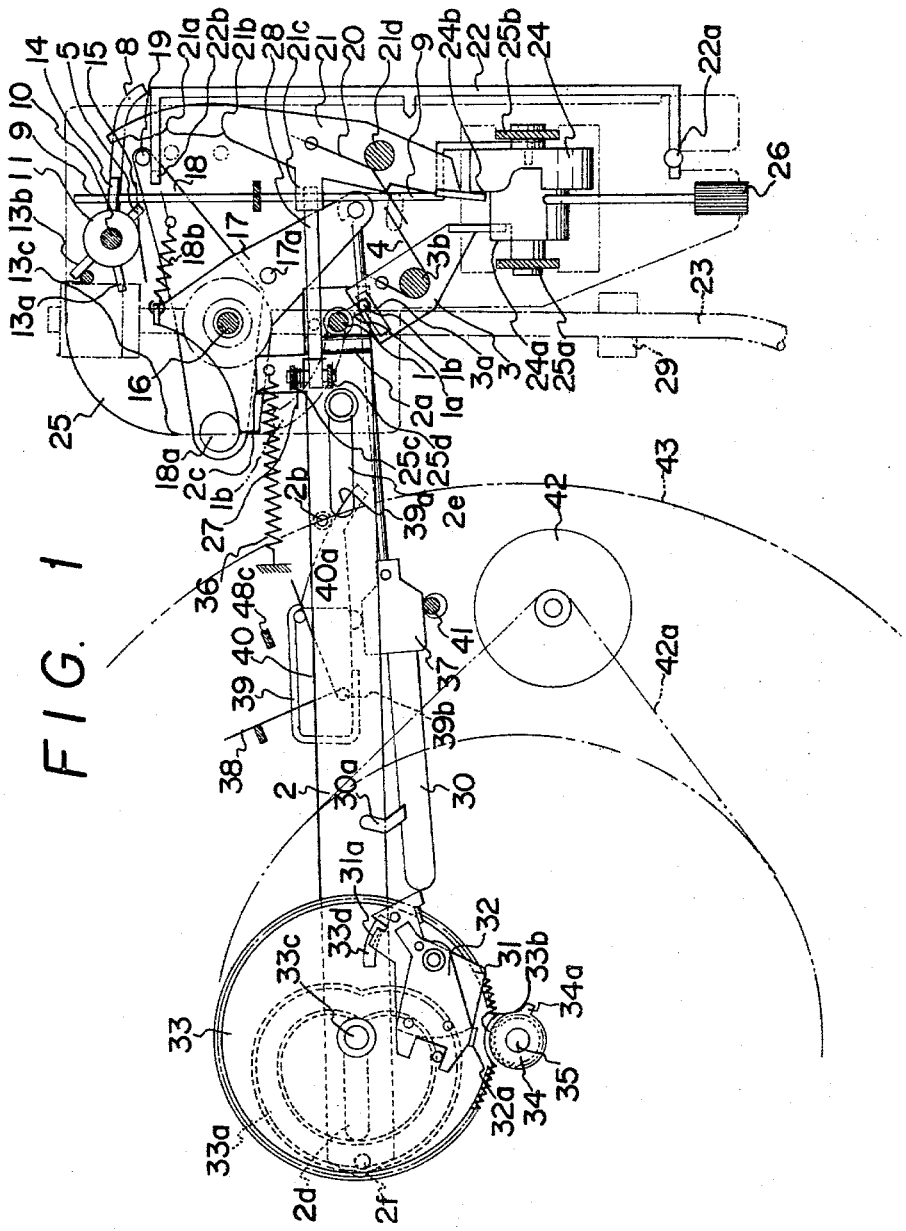

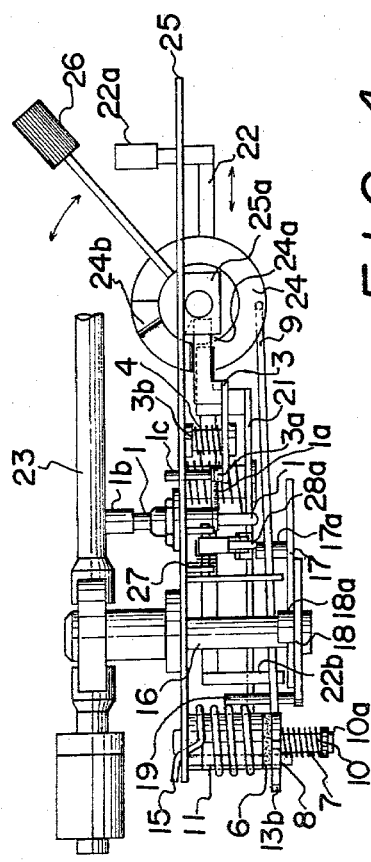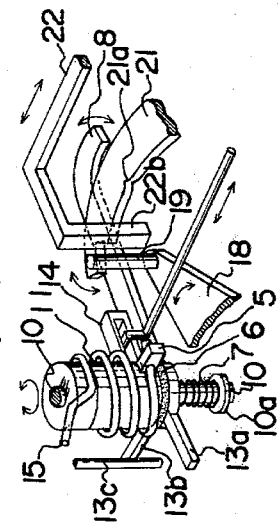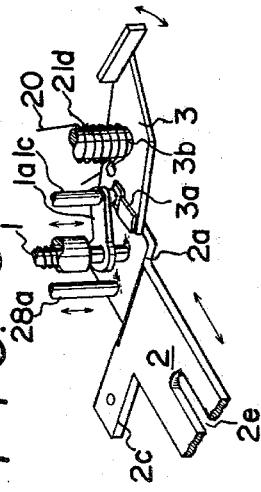

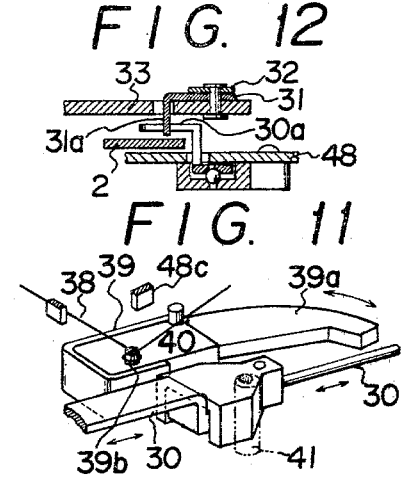

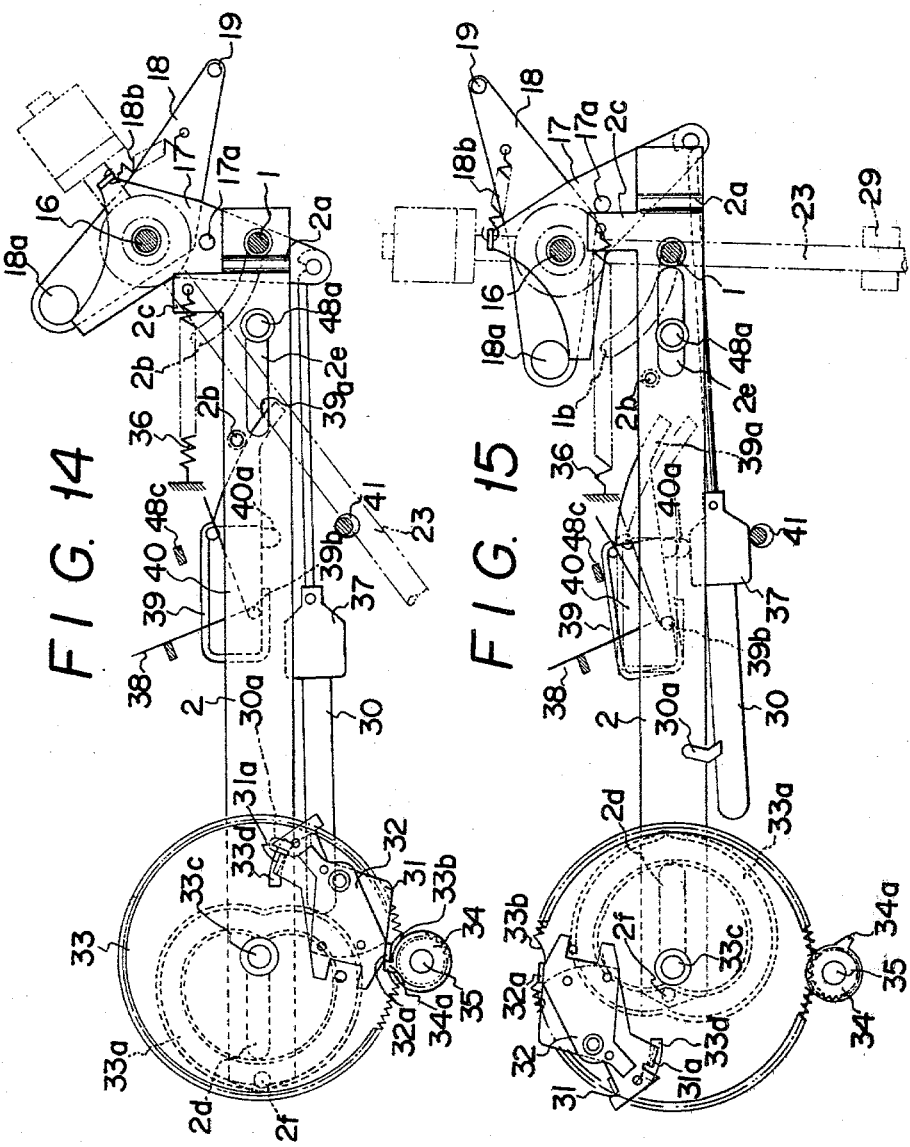

STYLUS LEAD-IN MECHANISM OF RECORD PLAYER

This application is a continuation-in-part of U.S. patent application Ser. No. 887,558 filed Mar. 17, 1978 now abandoned.

BACKGROUND OF THE INVENTION

The present invention is concerned with an automatic record player for automatically playing disc records of various sizes.

A record player equipped with a device for automatically leading the tone arm, a device for opening and closing the switch of the electric motor, and a tone arm auto-return mechanism, is usually called automatic record player.

BRIEF DESCRIPTION OF THE PRIOR ART

Conventional record players of this type are so constructed that a micro switch of an electric motor is turned ON when a record-size selector lever is manually set to various sizes of disc records, followed by setting a start lever at a start position, whereby an auto lead-in device is actuated by a drive gear rotated via a driving force transmission means such that the tone arm is brought to a lead-in groove on the disc record of any size, enabling the playback of the record to be carried out. When the playing of the records finished, the tone arm auto return mechanism is actuated again by the drive gear, so that the tone arm is returned to the original position, and the micro switch of the electric motor is turned OFF.

A listener, therefore, can enjoy the playback of records simply by placing disc records on the turntable without at all touching the tone arm. Some automatic record players are further equipped with a record changer to eliminate even the need of placing the disc records on the turntable.

The above-constructed automatic record players can be easily operated even by the beginners eliminating the probability of damaging to the disc records. However, with such record players, the record has to be played from the beginning even when it is desired to play the record from the middle. To solve such inconvenience, automatic record players that also permit manual operation are developed. With such record players, however, the tone arm is moved by hand onto the disc record. Therefore, there remains a problem that the stylus is inadvertently allowed to fall onto the disc record damaging it as is common with the conventional manual record players.

Further, if the device for automatically leading the tone arm is so constructed as to be actuated by the drive gear that is also used for the automatic return device, the tone arm is often fed excessively due to strong leading force, or is often bounced back after it hit the sector plate.

Next, conventionally, a tone arm auto-return mechanism equipped in the cabinet of the automatic record player has its drive pinion attached to a turntable shaft to which a turntable is ordinarily mounted, in the turntable utilizing a direct-drive system, the drive pinion is situated under surface of a boss portion which is formed under surface of the turntable, and in another turntable utilizing an indirect-drive system, the drive pinion is situated under the surface of a pulley which is formed under the surface of the turntable.

Therefore, since the drive pinion and the boss portion or the pulley axially overlapp, it is difficult to reduce the thickness of the cabinet. However, it has now been found desirable that the cabinet of the record player be thin so as to make the record player appearance smart and attractive.

In the prior art, the auto-return mechanism generally comprises a slide lever which moves longitudinally in cooperation with the tone arm and in response to its rotary movement, and a return plate cooperatively operate with a drive gear, which is caused to rotate by the movement of the slide lever, and this return plate moves longitudinally, lifts the tone arm situated on the lead-out groove of the record, takes it to an arm rest, i.e., to the original position position. Accordingly, a variety of switch operating means for opening and closing a micro switch of an electric motor in conformity with the movement of the return plate and the slide lever have been proposed. However, all these conventional switch operating means have a micro-switch firmly and immovable is fixed to a base plate, and a button which is constructed so as to be opened and closed by means of a contact lever operating in response to the movement of the slide lever or return plate. Therefore, the switch operating means is apt to be unstable. In order to obtain a stablized open and close operation, the structure of the means becomes disadvantageously complicated.

Further, there are many types of switch operating means for record players, and each of them utilizes a single button system. Accordingly, it is difficult to apply the single button system switch type operating means to the switch having a plurality of buttons, Since the contact intervals between respective buttons are not necessarily the same, it is difficult to effectively carry out the opening and closing operation of the switch.

Furthermore, generally, the conventional switch operating means has been constructed so as to cooperate with the tone arm auto-return mechanism. In this case, the switch device unnecessarily includes too many parts and structure thereof is excessively complicated.

OBJECTS OF THE INVENTION

A main object of the present invention is to provide a new and improved automatic record player of simplified construction which can satisfy a feeling of manual operation without losing the convenience of an automatic record player.

Another object of the present invention is to provide an automatic record player which can automatically lead-in the tone arm onto the disc record.

Still another object of the present invention is to provide a tone arm auto-return mechanism by which record cabinet configuration can be made thinner than conventional ones.

A further objection of the present invention is to provide a switch operating means simple in structure and capable of stably opening or closing the switch in cooperation with the tone arm auto-return mechanism of the record player.

A still further object of the present invention is to provide a switch operating means of the record player, which is simple in structure and can effectively and simultaneously open and close a switch provided with a plurality of buttons by cooperating with the tone arm auto-return mechanism.

An embodiment of the present invention will be explained with reference to the accompanying drawings.

BRIEF DESCRIPTION OF THE DRAWINGS

FIG. 1 is a schematic plan view of an automatic record player embodying the present invention, showing an operation lever in its forward position, FIG. 2 is a left-side cross-sectional view of FIG. 1, FIG. 3 is a perspective view of elevation means, FIG. 4 is a perspective view of energizing means and tone arm moving means, FIGS. 5 and 6 are similar views as FIG. 1, but showing sequential steps of operation of the operation lever, FIG. 11 is a partial perspective view of the switch operating means, FIG. 12 is a cross-sectional view of the tone arm auto-return mechanism, FIG. 14 is a plan view of the record player, but showing the tone arm moving onto a lead-out groove of the disc record, FIG. 15 is a similar view as FIG. 14, but showing the returned tone arm, FIG. 16 (A) is a side-sectional view of the energizing means, FIG. 16 (B) is a plan view of the energizing means.

DETAILED DESCRIPTION

Figure 13:
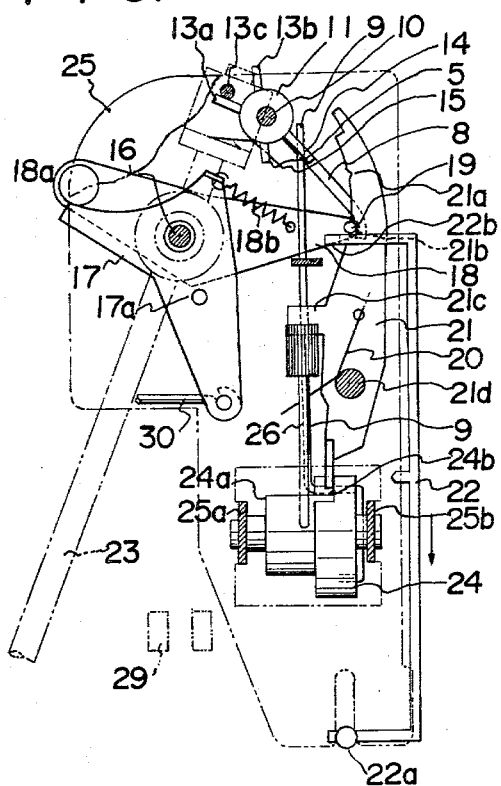
FIG. 13 is a schematic plan view of the record player embodying the present invention, but showing an auto lead-in operation of a 17 cm disc record.

Referring to FIGS. 1 to 16, as is clearly shown therein, an automatic record player of present invention comprises a turntable, a tone arm, an elevation rod, an elevation means, an energizing means, a tone arm moving means, an operation means, an auto-return mechanism, and a switch operating means.

The elevation means, as especially shown FIG. 3, comprises an elevation rod 1 provided with a conventional oil damper structure, and an elevation plate 3 rotatably mounted on the connecting pin 3b fixed to a lower surface of the base plate 25. An upper end of the elevation rod 1 is provided with an elevation arm 1b and a lower end of same is provided with a rotation prevanting member 1a. The elevation plate 3 is provided with a slanted protrusion 3a at its rear end portion which is abuts a lower end of the elevation rod 1 and the elevation plate 3 is normally biased about the axis of the connecting pin 3b by means of a coil torsion spring 4 which is interposed between the elevation plate 3 and the base plate 25, and a front end portion of this elevation plate 3 abuts against a cam surface 24a of the cam 24 as will be described hereinafter. One end of the rotation preventing member 1a is provided with an elongated pin 1c which extends upwards through a hole, not shown, formed in the base plate 25 for preventing the rotation of the elevation rod 1.

The energizing means, especially as shown in FIGS. 2, 4, 16(A) and 16(B), comprises a supporting spindle 10 one end of which is fixed to the lower surface of the base plate 25 and extends downwardly therefrom, this supporting spindle 10 has an intermediate portion provided with a boss 12b having blades 12a 12a . . . extending in the radial direction at substantial distances from one another, a container 11 provided with a spring engaging protrusion 5 and projection 14, this container 11 is pivotally mounted on the supporting spindle 10 and contains oil as well as the blades 12a therein and is biased to rotate in a clockwise direction by a coil torsion spring 15 interposed between the spring engaging protrusion 5 of the container 11 and the base plate 25, a bow-shaped sensing pin pushing member 8 is pivotally mounted on the supporting spindle 10, the sensing pin pushing member 8 is provided with stoppers 13a, 13b which are spaced at different radial distances, a pushing rod 9 extending between the projection 14 of the container 11 and the cam 24, and a friction member 6 which is also mounted on the supporting spindle 10, the friction member 6 being engaged with the container 11 and sensing pin pushing member 8 therebetween.

Since a coil compression spring 7 extends between the sensing pin pushing member 8 and a washer 10a fixed to the lower end of the supporting spindle 10, the sensing pin pushing member 8 is pressed towards the friction member 6 and can be rotated with the container 11 by friction force of the friction member 6.

A stopper pin 13c, which extends downwardly from the under surface of the base plate 25, is located between the stoppers 13a and 13b. The projection 14 is provided with a long hole 14a engaged with a crank-shaped portion of the pushing rod 9 for preventing the rotation of the container 11 and a front end portion of the pushing rod 9 is connected with a side-end surface of the cam 24 as will be described hereinafter.

The tone arm moving means, as especially shown in FIGS. 2 and 4, comprises a sensing pin 19 fixed to one-end portion of a sensing plate 18 which is fixed to a lower-end portion of a tone arm prindle 16, a selector plate 21 is pivotally mounted on a connecting pin 21d fixed to a lower surface of the base plate 25, and a selector lever 22 is slidably mounted on the base plate 25 and is provided with an upwardly extending manual lever 22a at its front end and a downwardly extending stopper member 22b at its rear end.

The selector plate 21 is biased to rotate about the axis of connecting pin 21d by means of the coil torsion spring 20 interposed between the selector plate 21 and base plate 25 and is provided with two concave portions 21a and 21b at its rear side edge. The front end portion of the selector plate 21 abuts against a cam surface 24b of the cam 24 as will be described hereinafter.

Figure 7:
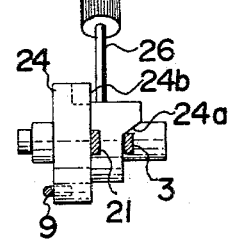
FIGS. 7 to 9 are front-side views of the operation means, showing sequential steps of operation of the operation lever.
Figure 8:
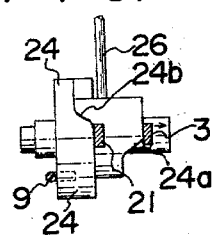
Figure 9:
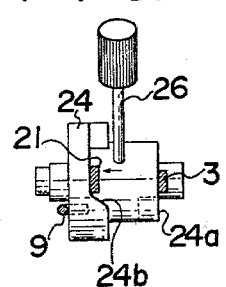

According to the present invention, the operation means, as especially shown in FIGS. 7 to 9, comprises a cam 24 pivotally mounted on lugs 25a and 25b which extends downwardly from the base plate 25 and the cam 24 is provided with axially arranged two-stage cam surfaces 24a and 24b, and an operation lever 26 fixed to the cam 24 and extends upwardly from the base plate 25. The front end portion of the elevation plate 3 abuts against the first stage cam surface 24a, the front end portion of the selector plate 21 abuts against the second stage cam surface 24b and furthermore, the front end portion of the pushing rod 9 is connected to the side-end surface of the cam 24.

Figure 17:
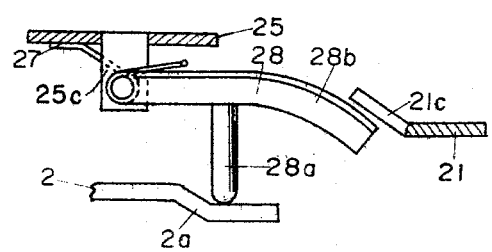
FIG. 17 is a partial front view of a retract lever.

Also, especially as shown in FIGS. 1 and 17, there is a retract member 28 for retracting the selector plate 21. This retracting member 28 is pivotally mounted on lugs 25c, 25d which extend downwardly from the under surface of the base plate 25 for retracting of the selector plate 21 and this retracting member 28 is also provided with a protrusion 28a extending downwardly from a substantially intermediate portion of the retracting member 28 and an arc-shaped portion 28b at one side-end portion thereof. A lower end of the protrusion 28a abuts against the upper surface of the lower bent portion 2a of the return plate 2, an upper surface of the arc-shaped portion 28b located at a lower side of a receiving protrusion 21c extends from a side edge portion of the selector plate 21. Further, a coil torsion spring 27 is interposed between the base plate 25 and the retracting member 28 when not playing a record, the tone arm outer end normally rests on an arm rest 29.

When the tone arm 23 is positioned on an arm rest 29 prior to record playing, an operation lever 26 is sifted down its forward position, as shown in FIGS. 1 and 2. In this condition of the operation lever 26, the front end portion of the elevation plate 3 abuts against a lower-flat portion of the first-stage cam surface 24a, as especially shown in FIG. 7, and an upper surface of the rear end portion of the elevation plate 3, as especially shown in FIG. 3, abuts against a lower-end portion of the rotation preventing member 1a fixed to the elevation rod 1, so that this elevation rod 1, provided with the conventional oil damping device, is in its downwardly shifted position. Further, under the same conditions as the operation lever 26 mentioned hereinbefore, the front end portion of the selector plate 21 of the tone arm moving means abuts, as especially shown in FIG. 7, against the upper-flat portion of the second cam surface 24b so that the rear side edge of the selector plate 21 does not contact the sensing pin 19. Furthermore, a bent portion of the pushing rod 9, as especially shown in FIGS. 4 and 10, pushes the projection 14 through the bent portion for preventing rotation of the container 11 the sensing pin pushing rod 8, therefore, does not contact the sensing pin 19 either.

The conventional auto-return mechanism of the tone arm 23, as especially shown in FIGS. 1 and 12, will be described in detail hereinafter.

The conventional auto-return mechanism of the tone arm 23 comprises a slide lever 30 to which is pivotally connected the operation plate 17 at its right side end and is reciplocally movable with the tone arm 23 through the operation plate 17 pivotally mounted on the tone-arm spindle 16, and this slide lever 30 is provided with a tongue-shaped piece 30a which extends upwardly through a slot formed in the main plate 48 for guiding the movement of the tongue-shaped piece 30a, as shown in FIG. 12.

Another end portion of the operation plate 17 abuts against a stud 18a which is fixed on the upper surface of the sensing plate 18 and the coil tension spring 18b extends between the sensing plate 18 and the operation plate 17. The auto-return mechanism also comprises a large gear 33 pivotally mounted on a shaft 33c fixed to the upper surface of the main plate 48. This large gear 33 has a notch portion 33b formed in the peripheral edge thereof and has a substantially heart-shaped groove 33a formed on its under surface. Furthermore, the large gear 33 is provided with a curved slot 33d and two link claws 31 and 32 which are overlappingly and pivotally mounted on its upper surface. The link claws 31 and 32 provided with a downwardly bent piece 31a and an upwardly bent piece 32a and the downwardly bent piece 31a extends downwardly from the large gear 33 through a curred slot 33d.

The auto-return mechanism also comprises a drive pinion 34 an upper end of which is formed with an engaging protrusion 34a and the drive pinion 34 is fixed to a turntable spindle 35. This drive pinion 34 normally falls into the notch portion 33b of the large gear 33 and is idly rotated in the notch portion 33b.

The auto-return mechanism further comprises a return plate 2 which has longitudinally extending slots 2d, 2e in which a pin 48a and the shaft 33c extending upwardly from the base plate 48 are engaged. This return plate 2 also has a left side end portion fixed to a pin 2f engaged with the cam groove 33a and a right side portion thereof formed with the bent portion 2a mentioned hereinbefore. Further, the return plate 2 has a pushing protrusion 2c horizontally extending from the rear edge of its right side and a downwardly extending operating pin 2b located benezth a slot 2e for operating a micro switch 40 of a electric motor 42, as will be described hereinafter, and the return plate 2 is always pulled in the leftward direction by means of a coil tension spring 36 extending between the main plate 48 and pushing protrusion 2c.

A switch operating means, as especially shown in FIGS. 1 and 11, comprises a switch control piece 37 pivotally mounted on the substantially intermediate portion of the slide lever 30, the operating pin 2b extending downwardly through a slot (not shown) formed on the main plate 48 from a lower surface of the return plate 2, as described hereinbefore, and a micro-switch 40 accommodated in a switch box 39 which is rotatably mounted on a supporting pin 39b fixed to the lower surface of the main plate 48. This switch box 39 has a beak-shaped protrusion 39a and is urged to rotate in an counter-clockwise direction by means of coil torsion spring 38 interposed between the main plate 48 and the switch box 39. Further, the switch operating means includes a stopper piece indicated by 48c for preventing an over rotation of the switch box 39, and an eccentric stopper 41 fixed to the lower surface of the main plate 48 for preventing a retraction of a switch control piece 37.

Prior to the record being played, when the operating pin 2b pushes the beak-shaped protrusion 39a in a clockwise direction and the switch-control piece 37 pushes a button 40a, the micro-switch 40 is turned OFF. The stopper 41 prevents the switch control piece 37 from retracting.

After a 30 cm diameter record has been mounted on the turntable 43, as illustrated in FIG. 1, the selector lever 22 is pushed to the 30 cm position, that is the rearward position, so that the stopper member 22b correspondingly moves in the rearward direction.

Thereafter, the operation lever 25 is raised to a vertical position, as shown in FIGS. 5 and 8, from its forward position, as shown in FIGS. 1, 2 and 7, thereby, cam 24 correspondingly rotates in a counter-clockwise direction.

Thereupon, since the front end portion of the elevation plate 3 is pushed by the first stage cam surface 24a and rotates in a clockwise direction, the rotation preventing member 1a contacts an upper portion of the slanted protrusion 3a and thus, elevation rod 1 moves upwardly and at the same time, the front side portion of the tone arm 23 is moved upwardly by elevation arm 1b formed with an upper end of the elevation rod 1. At this time, a front end portion of the selector plate 21 slides on a second stage cam surface 24b of the cam 24, but however, as this slide position of the cam surface 24b is still flat, as shown in FIG. 8, selector plate 21 remains in a non-operative condition, thus, in this condition, the rear side edge of the selector plate 21 does not contact the sensing pin 19.

Further, at same time, pushing rod 9 moves slightly in a forward direction, but however, since a predetermined clearance corresponding to the moving distance of the sensing pin pushing member 8 is provided between the sensing pin pushing member 8 and the sensing pin 19, the sensing pin pushing member 8 does not contact the sensing pin 19 in this condition either. Thereby, as the sensing pin 19 is place in what is called a freely movable condition at this stage, the tone arm 23 can be manually moved toward the disc record. Therefore, in another embodiment of the present invention, the sensing pin 19 may be constructed so as to engage with the concave portions 21a and 21b of the selector plate 21 when the operation lever 26 is raised in a vertical position by properly changing the position and inclination degree of the cam surface 24b. Constructing the tone arm 23 in this manner advantageously permits the tone arm 23 to clickly stop on the lead-in groove of various record sizes even when the tone arm 23 is led-in by manual operation.

Figure 10:
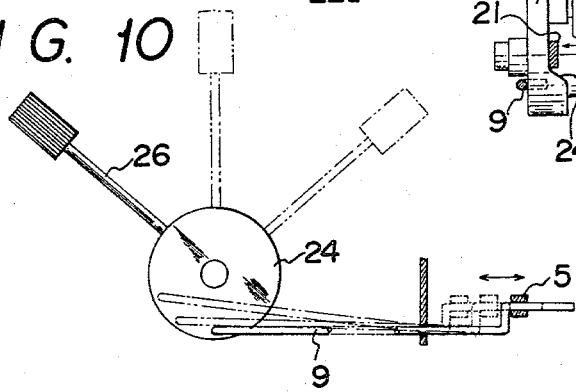
FIG. 10 is a right-side view of the operating means, but showing the operative relationship between a cam and a pushing rod.
Figure 16A:
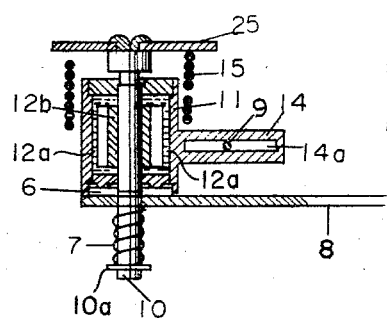
Figure 16B:
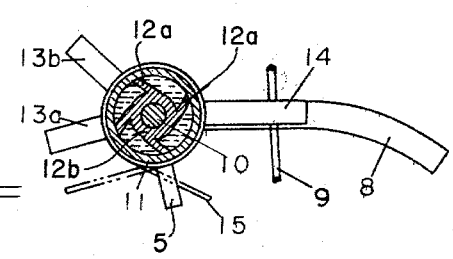

Next, as shown in FIGS. 6 and 9, when the operation lever 26 is pushed to its rearward position, the front end portion of the elevation plate 3 remains in contact with an upper flat portion of a cam surface 24a so that the elevation plate 3 does not turn in any direction. However, the selector plate 21 of the cueing means and the pushing rod 9 of the energizing means are affected simultaneously by the rotation of the cam 24. Thus, the front end portion of the selector plate 21 drops onto the lower flat portion from the upper flat portion located in the second-stage cam surface 24b, so that this selector plate 21 rotates in a counter-clockwise direction and the rear side edge of the selector plate 21 contacts the sensing pin 19. At the same time, as the pushing rod 9, which is connected to the one side surface of the cam 24, as shown in FIG. 10, is further pulled in a forward direction by the rotation of the cam 24, the sensing pin pushing member 8, which is released from stopping movement of the pushing rod 9, is slowly rotated in a clockwise direction with the container 11 by the frictional function of the friction member 6 and the damper mechanism, as described hereinbefore, for pushing the sensing pin 19 in a clockwise direction. When the sensing pin 19, which is pushed by the sensing pin pushing member 8, rotates in a clockwise direction and drop into the first concave portion 21a of the selector plate 21, the sensing pin pushing member 8 abuts against the operative member 22b of the selector lever 22 and the sensing pin pushing member 8 no longer pushes the sensing pin 19 so that the sensing pin 19 stops in the concave portion 21a and accordingly, the tone arm 23 cooperatively and automatically moves with the sensing pin 19 through the sensing plate 18 toward the disc record.

Thus, a stylus of the tone arm 23 stops on the lead-in groove of the 30 cm diameter disc record.

On the other hand, when the tone arm 23 moves toward the disc record, as the operation plate 17 cooperatively rotates in a clockwise direction, the slide lever 30 moves longitudinally leftward. Thus, the switch control piece 37 pivotally mounted on the slide lever 30 moves away from the button 40a of the micro-switch 40 and turn ON causing the turntable 43 to rotate by means of drive belt 42a and electric motor 42.

Thereafter, when the operation lever 26 is raised to the vertical position again, as shown in FIGS. 5 and 8, the cam 24 rotates in a counterclockwise direction and the front end portion of the selector plate 21 contacts onto the upper flat portion from lower flat portion of the second cam surface 24b, as shown in FIGS. 5 and 8, therefor the selector place 21 rotates in a clockwise direction against the coil torsion spring 20 and the rear side edge (provided with the concave portions 21a, 21b) of the selector plate 21 moves away from the sensing pin 19 and at the same time, as the pushing rod 9, which is slightly moved longitudinally rearward by rotation of the cam 24, pushes the receiving protrusion 14 formed on the side of the container 11 through the bent portion thereof and the sensing pin pushing member 8 is slightly rotated in a counterclockwise direction with the container 11 by means of friction force of the friction member 6. Thus, the sensing pin pushing member 8 also moves away from the sensing pin 19 and accordingly, the tone arm 23 is put into a free condition.

Next, when the operation lever 26 is moved to its forward position again, as seen in FIGS. 1, 2 and 7, the front end portion of the elevation plate 3 is lowered onto the lower flat portion of the cam surface 24a and the elevation plate 3 rotates in a counter-clockwise direction through energization of the coil torsion spring 4, so that the rotation preventing member 1a, located on the upper portion of the slanted protrusion 3a, is silently lowered, and thus, the pick-up stylus fixed to the front end portion of the tone arm 23 is also lowered onto the lend-in groove of the disc record, and thereby, the playing of the disc record is begun.

On the other hand, when the operation lever 26 is moved to its forward position, as the cam 24 is rotated in a counter-clockwise direction as described above, the pushing rod 9 further pushes the receiving protrution 14 of the container 11 so that the sensing pin pushing member 8 is moved further away from the sensitive pin 19 and is returned to its original position.

In rearward position of the operation lever 26, when it is desired to return the tone arm 23 to the arm rest 29 for some reason prior to the tone arm 23 being lowered on the lead-in groove of the disc record, the tone arm 23 can be manually returned onto the arm rest 29 due to the fact that the sensing pin pushing member 8 pivotally mounted on the supporting spindle 10, and the selector plate 21 pivotally mounted on the connecting pin 21d, are pushed simultaneously by pushing action of the sensing pin 19 returning to its original position with the tone arm 23.

However, in order to lead-in the tone arm 23 automatically again, the same operations as hereinbefore mentioned must be performed once again after bringing the operation lever 25 doen to its forward position. By carrying out the operations in this manner, the selector plate 21 rotates in a clockwise direction by the operation of the cam surface 24b and moves away from the sensing pin 19 and further, the container 11 of the energizing means is pushed by the pushing rod 9 and rotates counter-clockwise through the receiving protrusion 14 thereof and returns to the position of the already retracted sensing pin pushing member 8, causing the energizing means to return to its original position.

When the playing of the record finishes and the pickup stylus moves into the lead-out groove, as shown in FIG. 14, the slide lever 30 enlarges its leftward moving pitch and causes its tongue-shaped piece 30a to push a downwardly bent piece 31a of the link claw 31, thereby rotating the link claw 32 therewith and an upwardly bent piece 32a of the link claw 32 engages with an engaging protrusion 34a of the drive pinion 34 for the slightly turning large gear 33 in a counter-clockwise direction. Then, the drive pinion 34 is detached from a notch portion 33b of the large gear 33 and both the drive pinion 34 and large gear 33 engage and the large gear 33 begins to rotate in a counter-clockwise direction. Thereafter, as shown in FIG. 15, the return plate 2, which is engaged with a heart-shaped cam groove 332 at its left side, starts to move in a rightward direction against the pulling force of a tension coil spring 36. Thereby, at first, after the return lever 2 raises the elevation rod 1 through its bent portion 2a, the pushing protrusion 2c pushes a receiving pin 17a which is fixed to the operation plate 17 which cooperatively rotates with the tone arm spindle 16 so that after the tone arm 23 is raised, it is returned to the arm rest 29. Next, when the return plate 2 moves leftward and returns to its original position, as shown in FIG. 1, the elevation rod 1 is lowered by being freed from the elevating function of the bent portion 2a and lower the tone arm 23 onto the arm rest 29 in turn. At the same time, as the operating pin 2b pushes the beak-shaped protrusion 39a of the switch box 39 in a clockwise direction against the coil torsion spring 38, the button 40a of the micro switch 40 is pressed by the switch control piece 37 which has already turned to its original position along with the slide lever 30, as shown in FIG. 15, and thus, the micro switch 40 is turned OFF for stopping the electric motor 42.

When it is desired to play a disc record of 17 cm diameter, the selector lever 22 must be pulled to its forward position, as shown in FIG. 13, which causes the stopper member 22b of the lever 22 to move to a position which does not in contact with the sensing pin pushing member 8. The operation of the operation lever 26 to be carried out thereafter with reference to the 17 cm disc is the same as for the operation of a 30 cm disc mentioned above.

In this case, even when the operation lever 26 is moved rearward for moving the sensing pin pushing member 8 in a clockwise direction through the pushing rod 9, the sensing pin pushing member 8 does not abut the stopper member 22b of the selector lever 22 for the reason that the sensing pin pushing member 8 has the energizing force pushing the tone arm 23 through sensing plate 18 and the sensing pin 19 to a periphery of a 17 cm diameter disc record, however, the degree of energizing force is too little to push the sensing pin 19 ride over the second concave portion 21b of the selector plate 21. Therefore, in the case of 17 cm disc record, it becames unnecessary to utilize the stopper member 22b.

Next, when the sensing pin 19 is fitted the concave portions 21a and 21b and the sensing pin pushing member 8 of the energizing means abuts against the sensing pin 19, if the tone arm 23 is moved toward a center portion of the disc record for some reason or mis-operation, the auto-return mechanism operates.

In this case, when the return plate 2 moves toward the right side, a protrusion 28a placed on a substantially center portion of a retract member 28 rises by the operation of the bent portion 2a of the return plate 2, and at the same time, an arc-shaped portion 28b swings upwardly and pushes a receiving protrusion 21c of the selector plate 21 in a rightward direction before the pushing protrusion 2c of the return plate 2 pushes the receiving pin 17a of the operative plate 17, thereby the selector plate 21 rotates in a clockwise direction and is disengaged from the sensing pin 19. Therefore, the returning operation of the tone arm 23 may be carried out quite smoothly by reason of the sensing pin 19 does not drop into the concave portions 21a, 21b of the selector plate 21 even when the above-mentioned operation occurs.

In such a case, the sensing pin 19 also pushes the sensing pin pushing member 8 of the energizing means due to the tone arm 23 returning to its original position. However, as the pushing member 8 is pivotably mounted on the supporting spindle 10 and is attached to the container 11 through a friction member 6, the sensing pin pushing member 8 is pushed by the sensing pin 19 and the pushing member 8 is individually and frictively rotated in a counter-clockwise direction, and when the pushing operation of the sensing pin 19 has finished, the sensing pin pushing member 8 stops at that point and container 11 rotates and catches up with the sensing pin pushing member 8 when the operative lever 26 is brought to its forward position again, the reason for this being that the container 11 is rotated in a counter-clockwise direction through the protrusion 14 by the pushing rod 9 and the reason for this being that the sensing pin pushing member 8 is restricted to cooperatively rotate with the container 11 by stopper 13b thereof, at the same time.

Figure 18:
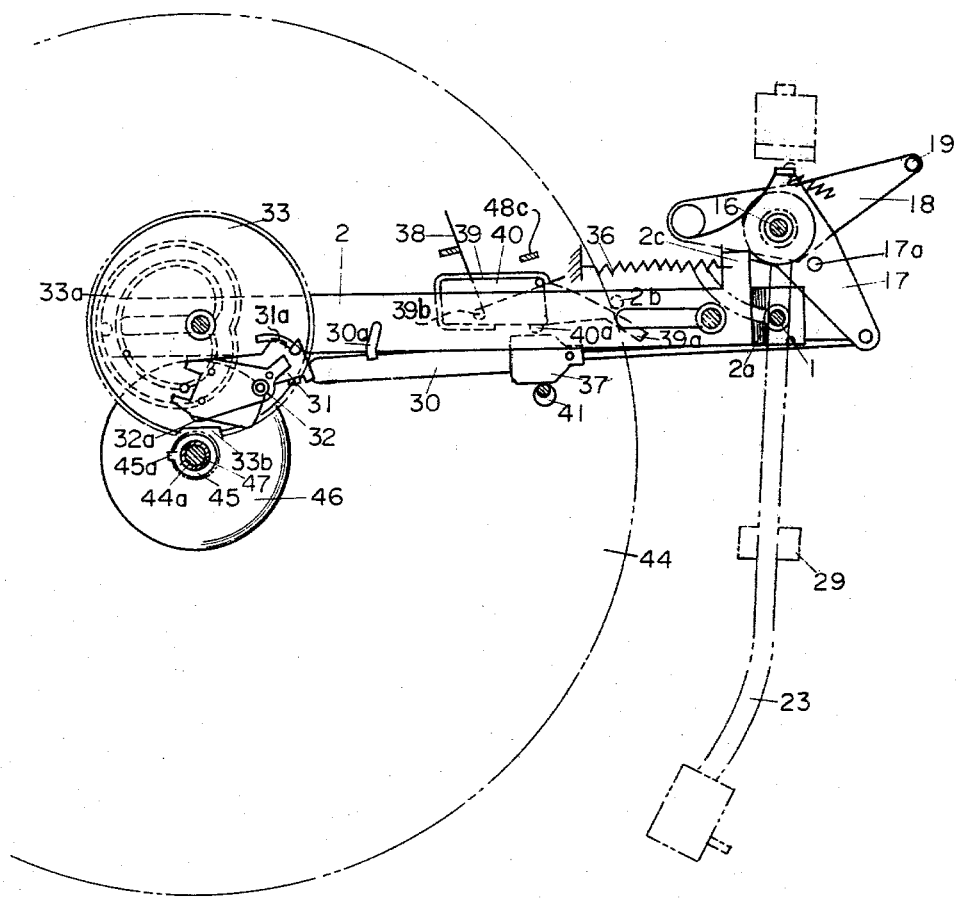
FIG. 18 is a plan view, showing another embodiment of the auto-return mechanism.
Figure 19:
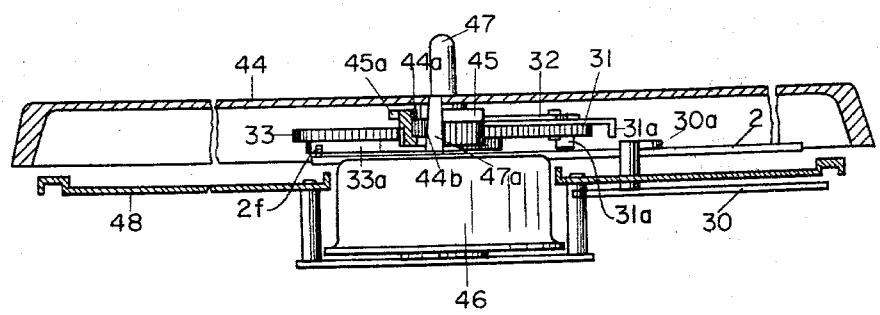
FIG. 19 is a front-sectional view of the same mechanism in FIG. 1, showing in FIG. 18.

FIGS. 18 and 19 show another embodiment of the auto-return mechanism of the present invention.

Referring to the drawing, this auto-return mechanism comprises a conventional constructed slide lever 30, a conventional large gear 33 as hereinbefore described respectively, and a drive pinion 45 provided with an engaging protrusion 45a protruding from an outer periphery thereof and this drive pinion 45 is fitted to an outer periphery of a boss portion 44a of the turntable 44. A tooth portion of the drive pinion is dropped into the notch portion 33b formed in the large gear 33. On the boss portion 44a of the turntable 44, axially fitting hole 44b is opened into which is fitted a tapered portion 47a of a turntable spindle 47 which also functions as a rotating spindle of a drive motor 46.

The operation of the auto-return mechanism in this embodiment is similar to that adapting an indirect drive system explained above. According to this embodiment, as the boss portion is not overlapped in a vertical direction by the pulley or the boss portion, the cabinet housing the turntable can be constructed thinner than conventional ones.

FIGS. 20 to 25 show another embodiment of the present invention of the switch operating means.

Figure 23:
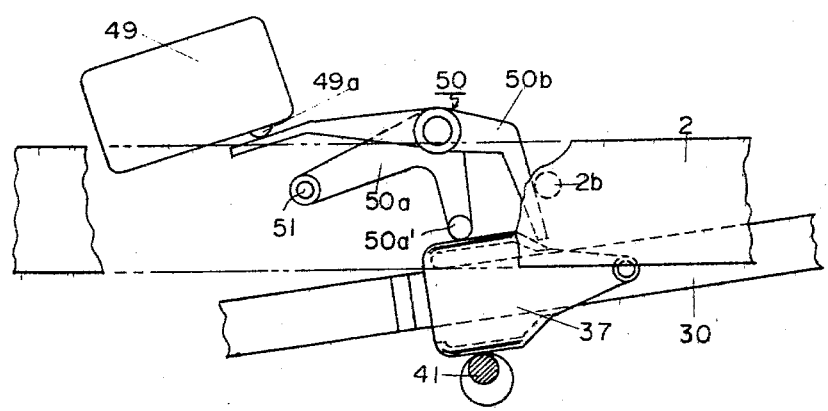
FIG. 23 is a partially enlarged plan view of FIG. 20.
Figure 24:
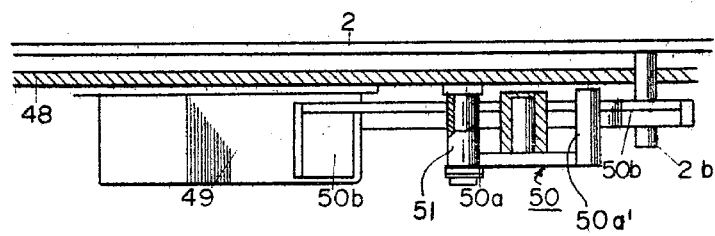
FIG. 24 is a partially front-sectional view of FIG. 23.
Figure 25:
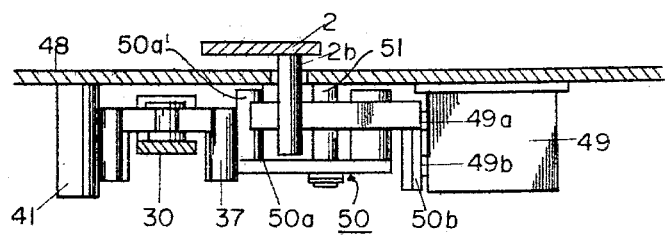
FIG. 25 is a right side sectional view of FIG. 23.

Referring to the drawings, the switch operating means comprises an operating pin 2b fixed to a lower surface of the return plate 2 and downwardly extends through a slot, not shown, formed in the main plate 48, a switch control piece 37 pivotally mounted at a substantially intermediate position of a slide lever 30, an eccentric stopper 41 downwardly extending from a lower surface of a main plate 48, a micro-switch 49 provided with buttons 49a and 49b and fixed to the under surface of the main plate 48, and a switch pressing member 50 extends between the operating pin 2b, the switch control piece 37 and the micro-switch 49. This switch pressing member 50 comprises a <—shaped main moving piece 50a one end portion of which is pivotally mounted on a downwardly extending pin 51 fixed to the lower surface of main plate 48 while its other end portion is provided with a pin 50a' upwardly extending therefrom, and an arc-shaped resilient motion responsive piece 50b pivotally mounted on a bent portion of the main moving piece 50a extends between the buttons 49a, 49b and the operative pin 2b, as shown in FIG. 23.

When the record player is not being played, as the switch control piece 37 pushes an intermediate portion of the resilient motion responsive piece 50b through the main moving piece 50a, the resilient motion responsive piece 50b is bent and presses against the buttons 49a and 49b for turning them OFF.

When the tone arm 23 is raised from the arm rest 29 and moved onto the turntable 44 in order to start playing a record, the slide lever 30 moves longitudinally leftward therewith, as described hereinbefore, and the switch control piece 37 moves away the upwardly extending pin 50a' of the main moving piece 50a. Thus, the resilient responsive piece 50b returns to its original position by means of self-resiliency and the buttons 49a and 49b of the switch 49 are simultaneously turned ON. Then, button 49a closes thereby activating a drive motor 42 rotating the turntable 43 for playing a record and simultaneously, other supplemental equipment or parts of the record player are brought into operation by means of the other button 49b.

Figure 20:
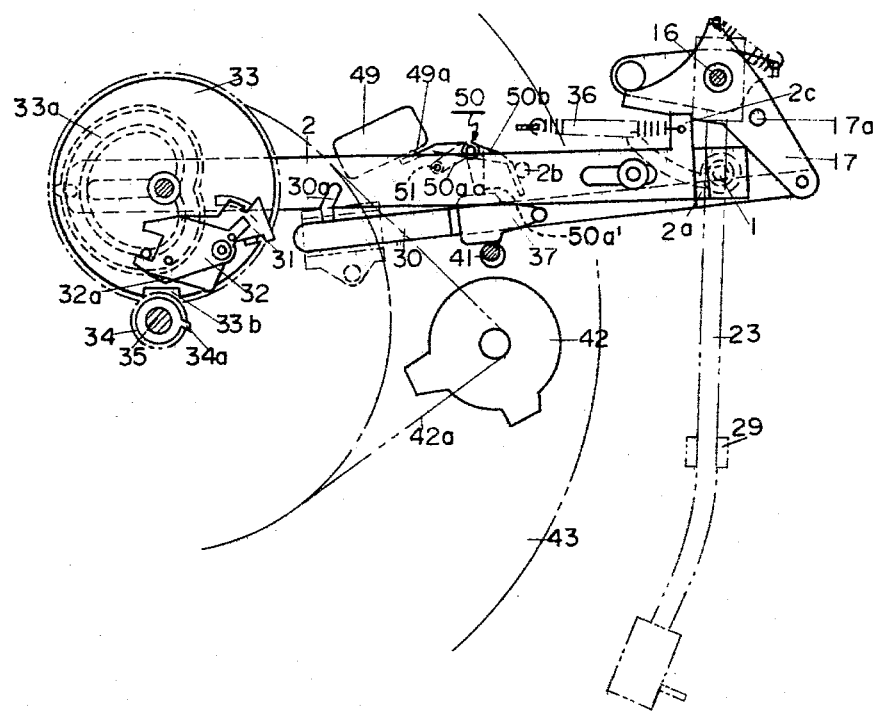
FIG. 20 is a plan view, showing still another embodiment of the switch operating means for the electric motor.
Figure 21:
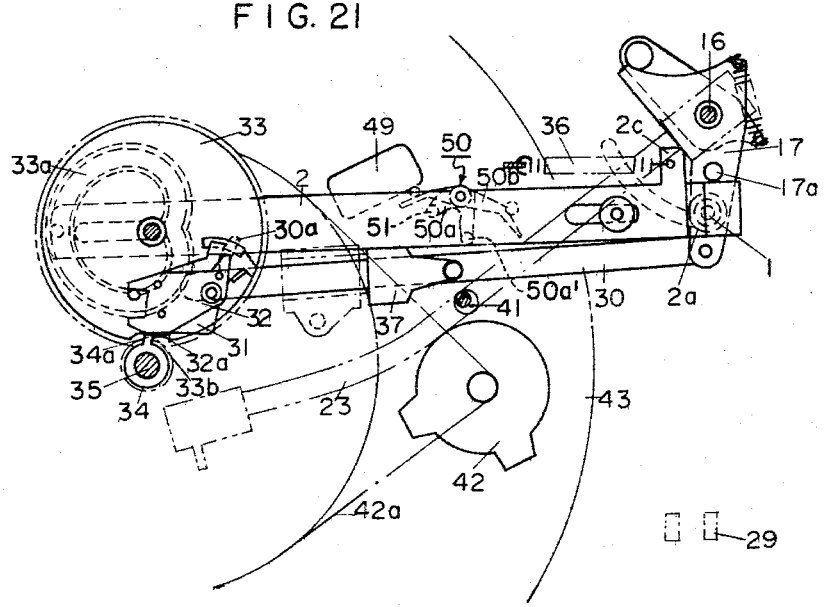
FIG. 21 is a plan view of the same embodiment in FIG. 20 when record playing has finished.

Next, when the playing the record finishes and the pick-up stylus moves onto the lead out groove of the disc record, the return lever 2 returns the tone arm 23 onto the arm rest 29 via the operations mentioned above (refer to FIG. 22) and thereafter, returns to its original position (refer to FIG. 20).

Figure 22:
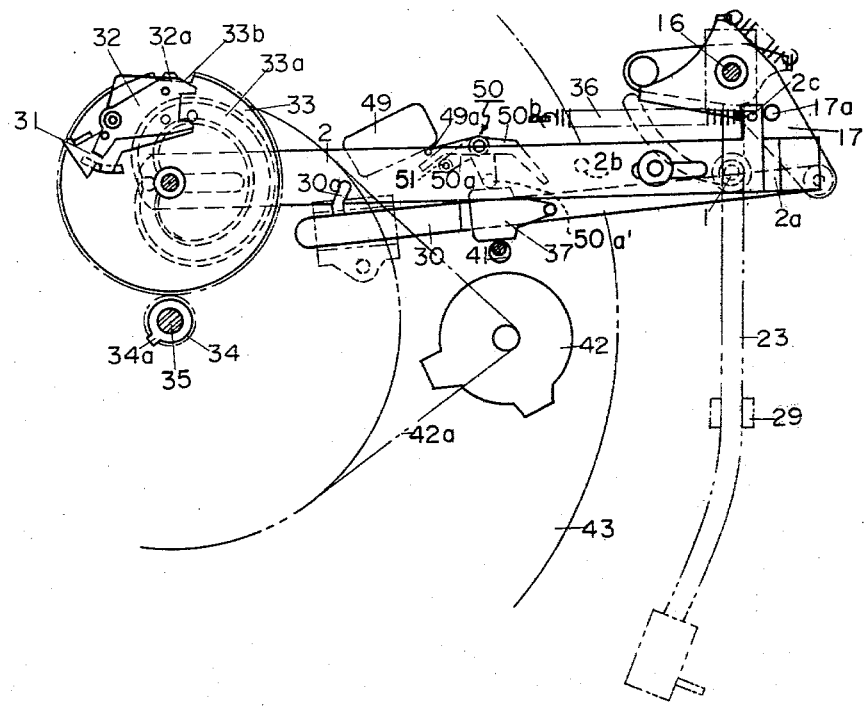
FIG. 22 is a plan view of FIG. 21, showing the tone arm returned to its original position.

At this time, the switch control piece 37 has already returned to its original position with the slide lever 30, as shown in FIG. 22, and has already abutted the upwardly extending pin 50a' of the main moving piece 50a through one side portion thereof and therefore, the resilient motion responsive piece 50b is bent by a pushing operation of operating pin 2b through one end thereof and turns the switch 49 OFF again through the other end thereof, as shown in FIG. 20. Thus, the electric motor 42 is effectively stopped.

At this time, the drive pinion 45 inwardly pushes link claws 31, 32 through a side portion thereof and drops into the notch portion 33b of the large gear 33, so that even if the tone arm 23 is moved again toward the record disk and the turntable 43 is rotated, the tone arm return mechanism does not activate.

On the other hand, in an another embodiment, if an eccentric pin is used for the operation pin 2b, the pressing position, where at the operating pin 2b pushes the resilient motion responsive piece 50b and the stopper 41 pushes the upwardly extending pin 52a' of the main moving piece 50a, can be easily adjusted.

As hereinbefore explained in detail, the present invention record playing can be enjoyed simple by merely mounting disc records of various sizes on the turntable and then operating the operation lever, without other manual operations, for example, manually operating the tone arm.

What is claimed is:

1. A record player for playing record discs of at least two sizes, comprising in combination:
    (a) a turntable (43) disposed for rotation in the horizontal plane, a tone arm spindle (16) at some distance therefrom;
    (b) a tone arm (23) with an inner section and also having an outer end, with a record playing stylus at said other end, the inner section of said tone arm being pivotally disposed on said tone arm spindle (16) in a manner that said tone arm (23) can swing in the horizontal plane so that the stylus can engage the outer playing portion of a record disc on said turntable (43), said tone arm likewise having at least a limited elevational pivotal movement;
    (c) an elongated return lever (2) extending between said turntable (43) and said tone arm spindle (16), said elongated return lever (2) having inner and outer portions;
    (d) operating means for operating said tone arm (23) including an operating lever (26) coupled to a two stage cam (24), an elevation means first operating member (3) coupled to said tone arm (23) for elevational movement of said tone arm, said first operating member (3) having a contacting portion in contact with said cam (24), a change-over lever (22) for determining the location of the record playing portion contacted by said stylus, a position restrictive plate (21) with a contact end and having at least first and second defined positions (21a, 21b) to determine the aforementioned record playing stylus locations, said position restrictive plate (21) having said contact end in contact with said cam (24) and an operation plate (17) attached to said tone arm spincle (16) disposed for reciprocating horizontal motion and having sensing means (18, 19) in contact with said position restrictive plate (21);
    (e) an elongated slide lever (30) with inner and outer ends, adjacent said return lever (2) longitudinally moveable along said return lever, the inner end of which is coupled to said operation plate (17);
    (e) switch operating means including a switch contact piece (37), intermediate said inner and outer portions of said return lever (2), for longitudinal movement together with the pivotal movement of said tone arm (23), including an operating pin (2b) on said return lever (2), a start switch (40) pivotally supported so as to be swingable between moving positions of said switch contact piece (37) and said operating pin (2b), a stopper (41) at one side of said switch contact piece (37) so disposed that said start switch (40) can be turned OFF only when said switch contact piece (37), said operating pin (2b) and said start switch (40), all occupy a predetermined position;
    (f) a turntable shaft (47), a drive pinion (45) mounted on said turntable shaft, a large gear (33) having a cam groove (33a) and a notch portion (33b) and link claw means (31, 32) which can be caused to engage with said drive pinion (34) by the movement of said slide lever (30), the return lever (2) outer portion extending into engagement with said cam groove (33a); and,
    (g) tone arm elevating means including a bent portion (2a) at the inner portion of said elongated return lever (2); an elevation rod (1) in contact with said bent portion (2a), and, an operation plate (17), contacted by said elevation rod (1) said operation plate (17) being pushed by said elevation rod (1) to enable said tone arm (23) to return from a position where said stylus is engaged with a record to an original position before such engagement.

2. A record player as claimed in claim 1, including an energizing means for automatically urging said tone arm (23) toward said turntable (43), said energizing means comprising: a base plate (25), a supporting spindle (10) mounted on said base plate, an oil damper container (5) pivotally mounted on said supporting spindle (10), a sensing pin pushing member (8) pivotally mounted on said supporting spindle (10), said pushing member being brought into contact with said container (5), and, pushing rods (9) for controlling the turning of said container (5).

3. A record player as claimed in claim 1, wherein said elevation means first operating member (3) is an elevation plate pivotally mounted on the lower surface of said base (25) and is urged to rotate in one direction, and further has a slanted protrusion (3a) on one side so that said slanted protrusion (3a) comes into contact with said elevation rod (1).

4. A record player as claimed in claim 1, wherein said start switch (40) is a micro-switch.

5. A record player as claimed in claim 1 including tone arm detecting means having said sensing means (18) so arranged and disposed as to move with said tone arm (23), said position restrictive plate (21) being swung horizontally by said operating means, being urged in one direction so as to contact said sensing means (18) to stop the tone arm (23) onto the lead-in groove of a disc record on said turntable (43).

6. A record player as claimed in claim 1 including two staged cam surfaces (24a, 24b) on said cam (24), said operating lever (26) being attached to said cam (24) and an end of said operating member and an end of said elevation plate (3) and an end of said position restrictive plate (21) respectively abut against said cam surfaces (24a, 24b) to one side surface thereof.

7. A record player as claimed in claim 1 including a switch pressing member (50) having a substantially arrowhead shape main moving piece (50a), one end of which is pivotally mounted on a main plate (48) and the other end of which abuts on said contact piece 37, and an arc-shaped resilient motion responsive piece (50b) pivotally mounted on a bent portion of said main moving piece (50a), said resilient motion responsive piece (50b) extending between said operating pin (2b) and said start switch (40).

* * * * *